Figure 1:
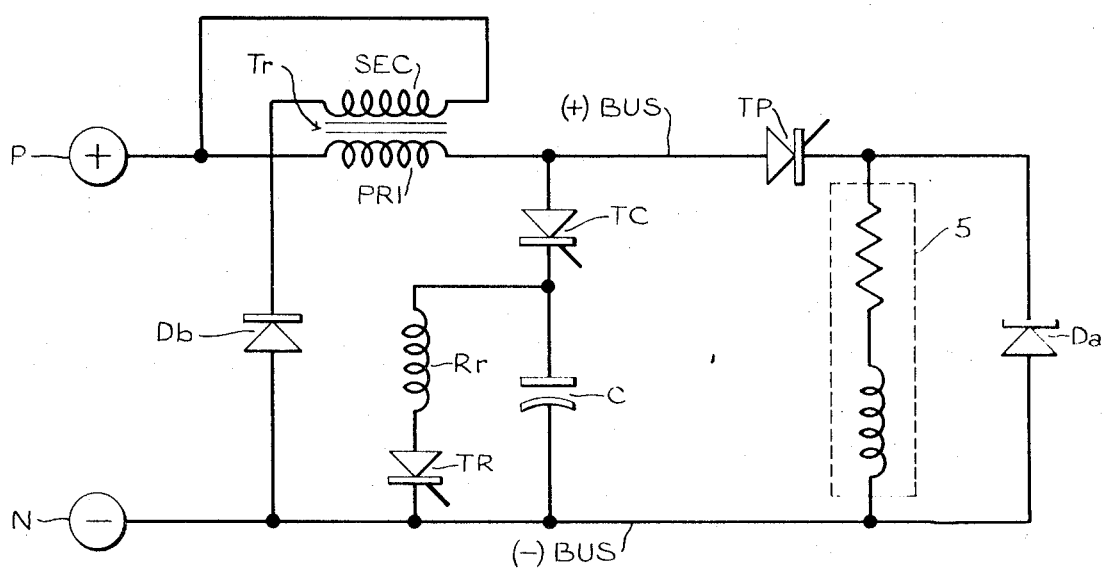

United States Patent

[11] 3,621,366

[72] Inventors David L. Duff
Burlington, Ontario;
Shashi B. Dewan, Toronto, Ontario, both of Canada
[21] Appl. No. 876,320
[22] Filed Nov. 13, 1969
[45] Patented Nov. 16, 1971
[73] Assignee Marathon Electric Research of Canada, Ltd.
Oakville, Ontario, Canada

[54] DC SIDE COMMUTATED CHOPPER AND INVERTER
2 Claims, 7 Drawing Figs.
[52] U.S. Cl. .................................................. 321/45 C, 321/45 ER
[51] Int. Cl. .................................................. H02m 7/52
[50] Field of Search .......................................... 321/5, 45, 45 C, 45 ER, 11

[56] References Cited
UNITED STATES PATENTS
3,386,027  5/1968  Kilgore et al. ................ 321/11

| 3,213,287 | 10/1965 | King | 321/45 UX |
| 3,321,697 | 5/1967 | Etter | 321/45 |
| 3,460,021 | 8/1969 | Schlabach | 321/5 |
| 3,470,449 | 9/1969 | Risberg | 321/45 X |

FOREIGN PATENTS
| 1,358,174 | 3/1964 | France | 321/45 |

OTHER REFERENCES
Electronic Design 11, " Disregard Load Impedance in SCR Inverter Design," pp. 68– 72, May 24, 1967.

Primary Examiner—William H. Beha, Jr.
Attorney—Ira Milton Jones

ABSTRACT: In a chopper or inverter having power thyristors that are switched on a control energization of a load from a DC source, and having commutating capacitors to which current is diverted from the power thyristors when they are to be switched off, recycling means are provided for recharging each commutating capacitor to bring it back to its original potential after each commutation and prepare it for the next commutation. Such recycling means comprises a thyristor (or a diode) and a reactor, in series, shunted across the capacitor. Several expedients are disclosed for preventing excessive charging of the commutating capacitor.

INVENTORS
David L. Duff
Shashi B. Dewan
BY
ATTORNEY

INVENTORS
David L. Duff
Shashi B. Dewan
BY
ATTORNEY

DC SIDE COMMUTATED CHOPPER AND INVERTER

This invention relates to apparatus for commutating power thyristors, thyratrons and other unidirectional controlled switching devices in choppers and inverters by which current is converted to pulsed or alternating current having any selected one of a range of frequencies; and the invention is more particularly concerned with means for efficiently recharging a commutating capacitor in such apparatus.

Inverter apparatus of the type with which this invention is concerned may be used, for example, to energize a three-phase induction motor. By means of such apparatus, the frequency of AC fed to the motor can be adjusted to any selected one of a wide range of values, thus providing for adjustable variation of the speed of the motor.

Very generally, such an inverter has a pair of DC input terminals and (in the case of a three-phase inverter) three AC output terminals. Each of the output terminals is connected to both terminals of the DC supply through a pair of unidirectional switching elements. The time during which each of the several switching elements is maintained conductive depends upon the frequency at which the inverter is required to operate and is governed by control apparatus that can be of a known type.

Desirably the switching elements are thyristors (also known as silicon controlled rectifiers or SCR's,) which have an anode, a cathode and a gate, and which have the ability normally to block both forward and back current flow between the anode and the cathode. But when a control signal is fed between the gate and the cathode of a thyristor, it becomes forwardly conductive, and it then remains conductive as long as current continues to flow through it in the forward direction, even though the control signal may be terminated. To switch off a thyristor that is connected with an inductive load, the current that has been flowing through the thyristor must be diverted at least momentarily to another part of the circuit. This is referred to as "commutating" the thyristor. After a brief interruption of forward current flow through a thyristor, it will return to its nonconductive state until a signal is again applied to its gate. The time interval required for switching off a thyristor can be materially decreased if, instead of merely terminating current flow through it, a reverse current is applied between its anode and cathode.

What has just been said about thyristors is also generally true of other unidirectional switching devices, such as thyratrons, that can be used in chopper and inverter circuits to which this invention relates. Although the invention is applicable to circuits employing such other unidirectional switching devices, it is herein described, by way of example, with particular reference to thyristors, inasmuch as they are now generally preferred for most chopper and inverter applications.

Those skilled in the art will recognize that an inverter of the type with which this invention is concerned has many principles in common with a chopper circuit and that chopper and inverter circuits pose certain common problems with respect to the commutation of power thyristors.

It is among the general objects of the present invention to provide solutions to these problems.

The usual means for commutating a power thyristor in a power circuit comprises a commutating capacitor connected in series with a commutating thyristor, the series-connected capacitor and commutating thyristor being shunted across the power thyristor. A reactance is connected in series with both thyristors to isolate the DC supply from the power thyristor during the time it is being commutated.

Normally the commutating capacitor has a charge of such polarity that when the commutating thyristor is switched on, current is diverted through the commutating thyristor from the power thyristor to the capacitor, and the capacitor impresses a back voltage across the power thyristor. The diverted current charges the commutating capacitor to a potential opposite to that which it originally had. Therefore at the end of each commutation the capacitor has the wrong polarity for the next commutation.

In one type of prior apparatus the commutating capacitor is connected in a commutating thyristor network whereby the connections of the capacitor terminals with the power thyristor circuit are in effect reversed with each successive commutation, so that the charge acquired by the capacitor at each commutation prepares it for the next commutation by virtue of the effective reversal of its terminal connections. Such an arrangement is described by Bradley et al. in "Adjustable frequency invertors and their application to variable-speed drives," Proc. IEE, Vol. III, No. 11, Nov. 1964, at page 1836 et seq.

In both choppers and inverters the employment of such a polarity reversal network has several disadvantages, among the more obvious of which are the multiplicity of commutating thyristors required for the reversing network and the complexity of the control apparatus needed for selectively firing the thyristors comprising that network.

An inverter having such a polarity reversal network normally has all of its power thyristors commutated simultaneously. This system, which is known as double-DC side commutation, has the disadvantage that it is impossible for one or more of the power thyristors to continue conducting while any others are being commutated.

Another commutating expedient used with inverters to avoid the all-or-none disadvantage of double-DC side commutation is an arrangement whereby the power thyristors comprising one half of the inverter bridge are commutated alternately with those comprising the other half of the inverter bridge. This is known as single-DC side commutation; and while it has the advantage of requiring fewer commutating thyristors than double-DC side commutation, it also makes for an inverter that cannot be used for all applications that might be desired for it, in that it is not possible to have successive commutations of a particular power thyristor without an intervening commutation of another power thyristor. Single-DC side commutation has the further disadvantage of posing problems with respect to high rates of forward voltage rise on the thyristors.

Arrangements are also known for commutating each power thyristor individually, independently of the other power thyristors in an inverter, but such commutation arrangements involve a multiplicity of components, and are therefore high in cost.

By contrast with these prior arrangements, it is an object of the present invention to provide commutation means for an inverter of the character described by which the inverter is rendered extremely versatile, in that a particular power thyristor can be commutated repeatedly without an intervening commutation of another power thyristor, although alternate commutation of the thyristors comprising each half of the inverter bridge is also possible; and which commutation means has the further advantages of being in itself low in cost and being capable of cooperating with a relatively simple and inexpensive control device.

More specifically it is an object of the present invention to provide simple and inexpensive recycling means for the commutating capacitor of a chopper or inverter of the character described whereby, after each commutation, the commutating capacitor can be recharged back to its original polarity, and which recycling means can be controlled by relatively simple control apparatus and, as applied to an inverter, does not interfere with efficient utilization of the energy diverted from the power thyristors during commutation.

Another object of this invention is to provide a highly efficient inverter of the character described that feeds back to the DC supply terminals regenerative energy from an inductive load on the inverter.

It is also an object of this invention to provide an inverter having a pair of DC input terminals and three AC output terminals, wherein each of the output terminals is connected with the DC terminals through a pair of power thyristors, one for each DC terminal, which inverter is capable of providing substantially higher frequency alternating currents than prior inverters, and with substantially higher efficiency, owing to the fact that the power thyristors connected with one DC terminal can be commutated successively, without an intervening commutation of those connected with the other DC terminal.

Another object of this invention, particularly achieved in certain embodiments thereof, is to provide efficient but inexpensive means for limiting to safe values the rate of current rise through commutating thyristors in apparatus of the character described, to adapt the apparatus for high-power applications.

With these observations and objects in mind, the manner in which the invention achieves its purpose will be appreciated from the following description and the accompanying drawings. This disclosure is intended merely to exemplify the invention. The invention is not limited to the particular structure or method disclosed, and changes can be made therein which lie within the scope of the appended claims without departing from the invention.

Figure 2:
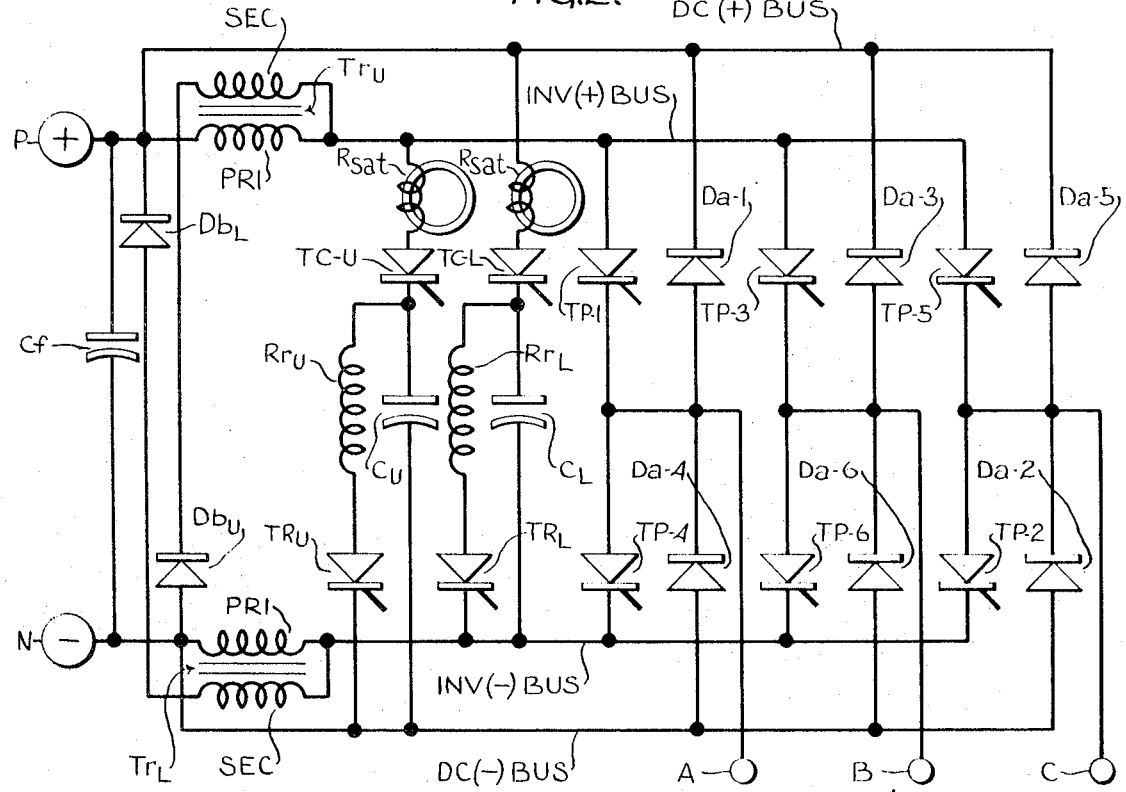

The drawings illustrate several complete examples of physical embodiments of the invention constructed according to the best modes so far devised for the practical application of the principles thereof, and in which:

FIG. 1 is a circuit diagram of a chopper which embodies the principles of this invention; FIG. 2 is a circuit diagram of an inverter which embodies the invention; and FIGS. 3 through 7 are fragmentary circuit diagrams illustrating several modifications of the commutating means of the inverter apparatus shown in FIG. 2.

Referring now more particularly to the accompanying drawings, FIG. 1 illustrates a chopper circuit which embodies the general principles of this invention and which can be used to provide for intermittent energization of a load 5 from a DC source connected with input terminal P and N. Each period of energization of the load is initiated by applying to the gate of a power thyristor TP a gate-drive signal from a suitable control device (not shown) to render the thyristor conductive. Current then flows from the positive DC terminal by way of a bus designated (+)BUS, through the power thyristor TP and the load, and back to the negative DC terminal N by way of a bus designated (−)BUS.

For terminating current flow through the power thyristor TP, and hence through the load 5, current must be diverted from the power thyristor, and for the purpose of such commutation there is provided commutating means shunted across the series-connected load 5 and power thyristor, which commutating means comprises a commutating capacitor C and, in series therewith, a commutating thyristor TC. To commutate the power thyristor TP, a signal is applied by the control device to the gate element of commutating thyristor TC. When thyristor TC is conducting, a reactor PRI cooperates with the capacitor to isolate the DC supply from the power thyristor TP. In this case the reactor PRI comprises the primary winding of an energy recovery transformer T$r$, the purpose of which is described hereinafter.

Initially, capacitor C has a charge such that the potential at the cathode of the commutating thyristor TC is negative with respect to terminal N by a predetermined voltage value. Therefore, when commutating thyristor TC is switched on, and the potential at the anode of power thyristor TP drops to nearly the potential of the cathode of commutating thyristor TC, a back voltage is impressed across the power thyristor, turning it off.

The current that had been flowing through the power thyristor and the load, and which is now diverted to flow through the commutating thyristor TC, charges capacitor C and raises the potential at the cathode of the commutating thyristor TC until it is at least equal to the potential of DC terminal P. (In fact, there is a tendency for the potential at that cathode to rise to a positive value above that at P, owing to the fact that the reactor PRI is in a resonant circuit with capacitor C, but this "over-shooting" is prevented as explained hereinafter.) When the potential at the cathode of commutating thyristor TC reaches its maximum positive value, and the capacitor tries to force current back through that thyristor, thyristor TC will of course be switched off.

It will be observed that the charge on capacitor C is now of the opposite sign from that which it initially carried, which is to say that the charge on capacitor is the reverse of that required for the next commutation of the power thyristor TP. For reversing the charge on the capacitor, a recycling means is shunted across the capacitor, comprising, in series, a recycling reactance R$r$ and a unidirectionally conductive device. In the chopper circuit of FIG. 1 the unidirectionally conductive device is a recycling thyristor TR. At a time after commutating thyristor TC is switched off, and before the next commutation of power thyristor TP must be performed, a gate signal is applied to recycling thyristor TR by the control device. With thyristor TR conducting, capacitor C and recycling reactance R$r$ are connected in a resonant circuit by which the capacitor is recharged back to its original potential. The capacitor is of course prevented from losing this charge of its original potential because the recycling thyristor TR is turned off by the back voltage that appears across it as soon as the capacitor attempts to discharge.

When the power thyristor TP is commutated, there would be a tendency for forward current to continue to flow through it due to the inductance of the load 5; but this is prevented by reason of the provision of a so-called free-wheeling diode D$a$ which is shunted across the load and which provides an alternate path for such regenerative current around a loop comprising said diode and the load. Note that the diode D$a$ is arranged to prevent flow of current from the positive bus to the negative one, and therefore it conducts only for an interval beginning with switching on of the commutating thyristor TC. It serves to clamp the potential of the cathode of power thyristor TP to the potential of the negative DC terminal N.

As briefly noted above, during commutation there is a tendency for the charge on the capacitor to overshoot in the absence of some means for preventing this from happening. Thus, if the reactance in series with capacitor C comprised only the primary winding PRI, it and the capacitor would comprise a resonant circuit having a low resistance, and the reactance would, in effect, try to charge the capacitor to a reverse potential of a value substantially higher than the value of the original charge upon it. A known expedient for preventing such overshooting is to connect a clamping diode across the reactance, through which the excess current flows and in which it is dissipated.

But in this case it is preferred, instead, to inductively couple with the reactance comprising the primary PRI a secondary winding, designated SEC, so that the two windings together comprise the energy-recovery transformer T$r$.

The secondary, in series with a diode $db$ is connected across the buses. The diode is so arranged as to block flow of current from the positive to the negative bus. During commutation, as the charge on the capacitor reaches the desired potential, the current through the primary winding or reactor PRI decreases rapidly, and this decreasing current through the primary induces a current in the secondary SEC which flows in the direction to forwardly bias the diode $db$ and through it flows back to the input terminals. The turns ratio of the windings PRI and SEC is so chosen that the diode becomes conductive when the capacitor has been charged to the desired potential. Such current flow through the secondary brings about a rapid termination of current flow through the primary PRI and to the condenser, and at the same time effects return of energy to the supply circuit that would otherwise be expended in overcharging the capacitor.

FIG. 2 illustrates an inverter which embodies the principles of this invention and which can be used for energizing a three-phase induction motor from a source of DC that is connected with input terminals P and N. A capacitor C$f$ connected across those terminals serves as a ripple filter. The motor or other load is connected with three-phase output terminals A, B and C.

Each of the input terminals P and N is connected through a reactor with a corresponding inverter bus INV(+)BUS and INV(−)BUS, respectively. Each reactor comprises the primary PRI of an energy-recovery transformer Tr$_U$ and Tr$_L$, respectively.

Each of the output terminals A, B and C is connected with each of the inverter buses through a power thyristor. Thus terminal A is connected with INV(+)BUS through thyristor TP-1 and with INV(−)BUS through thyristor TP-4. Similarly, terminals B and C are respectively connected with INV(+)BUS through thyristors TP-3 and TP-5 and with INV(−)BUS through thyristors TP-6 and TP-2. The thyristors TP-1, TP-3 and TP-5 that are connected with the positive inverter bus are herein referred to as the upper power thyristors, while the remaining power thyristors are designated the lower ones.

The upper power thyristors are all commutated at the same time, but independently of commutation of the lower ones, by commutating means comprising a commutating thyristor TC-U in series with a capacitor $C_u$; while the lower power thyristors are commutated simultaneously with one another by a similar commutating means comprising commutating thyristor TC-L in series with a capacitor $C_L$. Those skilled in the art will recognize that for the great majority of applications the proper phase relationship at the output terminals A, B and C will require or permit such simultaneous commutation of all of the upper power thyristors or all of the lower ones, but that for utmost versatility it should be possible both to commutate the upper and lower power thyristors alternately and to commutate either the upper ones or the lower ones successively. In either such commutation sequence there is an interval between successive commutations of a set of power thyristors during which recycling of its commutating capacitor $C_U$ or $C_L$ can take place.

It will be understood that suitable control apparatus (not shown) applies firing signals to the several thyristors at the proper times to cause the load connected with the output terminals to be energized with three-phase AC of the desired frequency.

In the case of the inverter illustrated in FIG. 2, regenerative energy from the load is fed back to the DC input under some load conditions, and under other load conditions it is recirculated back through the load circuit as in the free-wheeling arrangement of the FIG. 1 chopper. The circuit means for accomplishing this comprises a pair of diodes for each of the output terminals A, B and C, through which each output terminal is respectively connected, by way of buses DC(+)BUS and DC(−)BUS with the input terminals. Thus the terminals A, B and C are connected, through respective upper diodes D$a$-1, D$a$-3 and D$a$-5 with DC(+)BUS and thereby with the positive input terminal P, and are respectively connected through lower diodes D$a$-4, D$a$-6 and D$a$-2 and DC(−)BUS with the negative input terminal N.

Attention is directed to the fact that the commutating means for the upper power thyristors TP-1, TP-3 and TP-5, comprising commutating thyristor TC-U and capacitor $C_U$, is connected between the positive inverter bus and the negative DC bus, while the commutating means for the lower power thyristors, comprising commutating thyristor TC-L and capacitor $C_L$, is connected between the negative inverter bus and the positive DC bus. A saturable reactor $R_{sat}$ is shown connected in series with each commutating thyristor, for a purpose explained hereinafter.

As with the chopper circuit of FIG. 1, each of the commutating capacitors $C_U$ and $C_L$ of the FIG. 2 inverter is recharged to its original potential after each commutation. The recycling means for commutating capacitor $C_U$ comprises a recycling thyristor TR$_U$ in series with a reactor Rr$_U$, the series connected thyristor and reactor being shunted across the capacitor $C_U$. The recycling means for capacitor $C_L$ comprises a thyristor TR$_L$ and a reactor Rr$_L$ similarly arranged.

As with the chopper, the energy recovery transformers of the inverter have secondary windings SEC that prevent charging of the commutating capacitors to an excessive potential and which return excess energy to the DC supply. The secondary of each transformer Tr$_U$ and Tr$_L$ has a connection to the inverter bus to which its primary is connected, and is also connected, in series with a diode Db$_U$, Db$_L$, with the DC terminal of opposite polarity. Each of the diodes Db$_U$ and Db$_L$ is arranged to prevent flow of current from the positive bus to the negative one.

The operation of the inverter apparatus shown in FIG. 2 is generally similar to that of the FIG. 1 chopper. Assume that upper power thyristors TP-1 and TP-3 are conducting and are to be commutated, and that lower power thyristor TP-2 is also conducting and is to remain switched on. It will also be assumed that capacitor $C_U$ has been properly charged for commutation.

To commutate the upper power thyristors, a gate signal is applied to control thyristor TC-U, and current is thus diverted from TP-1 and TP-3 to capacitor $C_U$. As with the chopper circuit, the primary of the energy recovery transformer TR$_U$ serves as a reactor that supports the DC input potential plus the potential of the initial capacitor charge, and the secondary of the energy recovery transformer cooperates with its primary to return to the DC input excess energy which would otherwise tend to charge the capacitor beyond the desired new potential.

After control thyristor TC-U has been switched off in consequence of the new charge on capacitor $C_U$, that capacitor is charged back to its original potential by switching on its recycling thyristor TR$_U$ to permit current to flow in the resonant recycling circuit comprising capacitor $C_U$ and recycling reactor Rr$_U$.

It will be understood that commutation of the lower power thyristors is accomplished in a like manner, by switching on commutating thyristor TC-L, and that subsequent recycling of commutating capacitor $C_L$ is effected by switching on recycling thyristor TR$_L$ to place that capacitor in a resonant circuit with its recycling reactor Rr$_L$.

With either the chopper apparatus of FIG. 1 or the inverter of FIG. 2, there is a relatively high rate of current rise through each commuting thyristor at the time of commutation. The rate of this current rise depends upon the current drawn by the load and the distributed capacitance in the primary of the energy-recovery transformer. Since presently available thyristors can sustain only a limited rate of current rise without overheating, and since destruction of a thyristor due to heating is cumulative, the practical effect of high rate of current rise through the commutating thyristors is to require restrictions to be imposed upon the load that can be powered through the apparatus and/or upon the maximum frequency of commutation. Note that such limitations tend to be imposed for the sake of the commutating thyristors, rather than by the power thyristors, and hence the apparatus must in effect be derated to a power level substantially below that which would be feasible for the power thyristors if only they had to be considered.

One means of preventing such excessive current rise through the tends thyristors is to connect each of them in series with a small saturable reactor $R_{sat}$, as shown in FIG. 2. Preferably each saturable reactor has only a very few turns (two, for example) so that its distributed capacitance is so low as to be negligible. The saturable reactor supports the voltage when the commutating thyristor is first switched on, permitting only a relatively slow rise in current through the commutating thyristor; but because of the saturable character of the reactor its presence does not so limit the potential drop at the anodes of the commutated power thyristors as to significantly delay or otherwise interfere with commutation. However, the saturable reactor tends to increase the peak potential to which the commuting capacitor is charged by the diverted current, and in some cases it may be necessary to prevent overshooting of the commutating capacitors due to presence of the saturable reactors. Where the characteristics of the power thyristors require that the saturable reactor have a relatively high reactance, such overshooting of the commutating capacitors may exceed tolerable limits, and under those circumstances the excess capacitor-charging energy due to the saturable reactor can be either dissipated, by means of the apparatus illustrated in FIG. 3 or returned to the DC input by means of the apparatus shown in FIG. 4.

Figure 3:
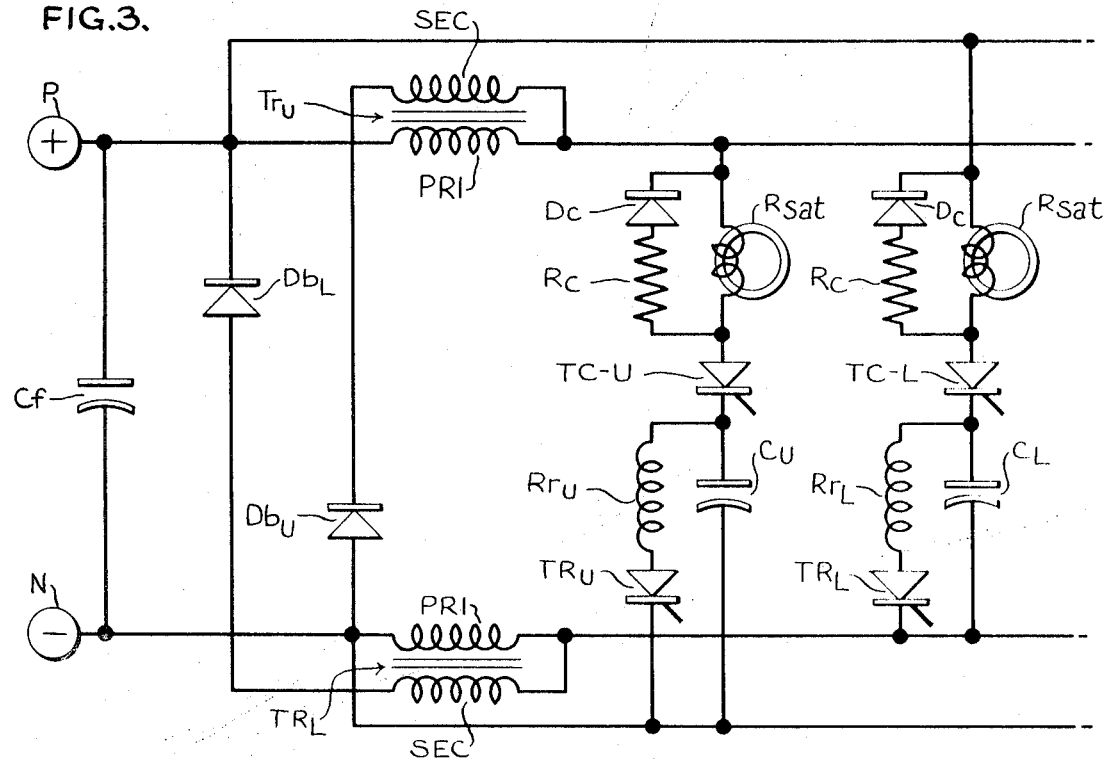

In FIG. 3, a diode DC, in series with a small resistor Rc, is connected across the saturable reactor $R_{sat}$. The diode is arranged to provide a path for the reactor current when the voltage across the saturable reactor reverses.

The current fed through this path is dissipated in the resistor.

Figure 4:
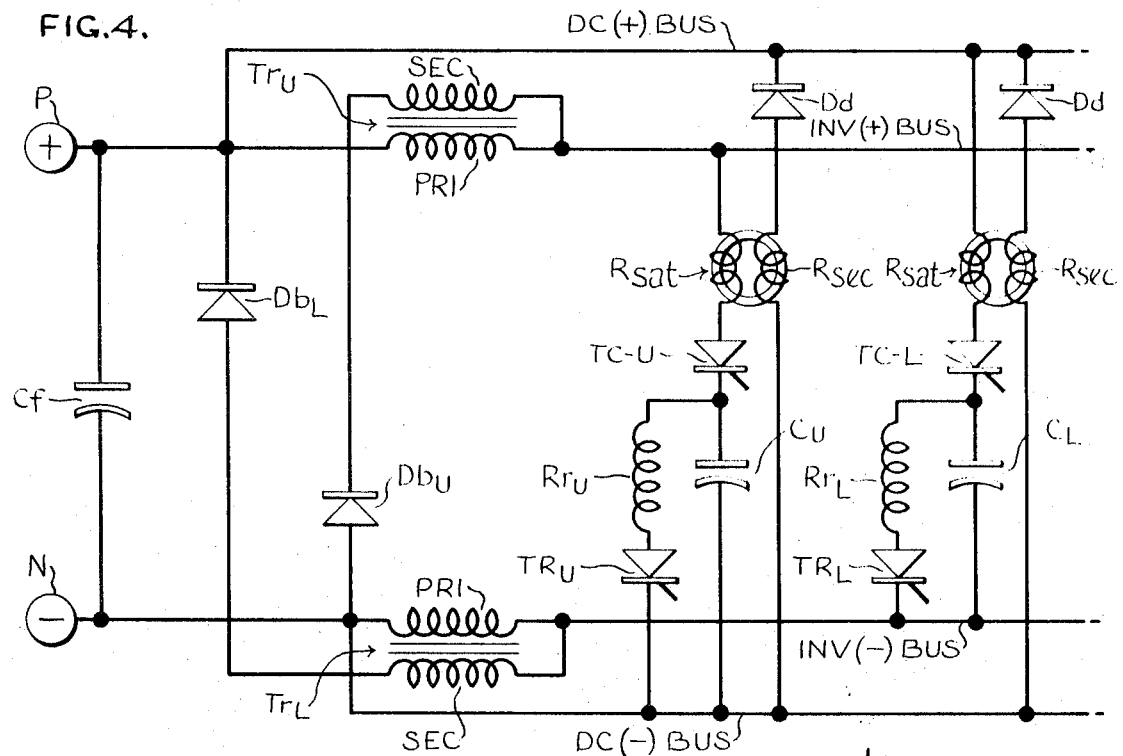

The arrangement illustrated in FIG. 4, while perhaps more expensive initially, is also more efficient and may therefore achieve long run economic advantages. In the FIG. 4 modification each saturable reactor $R_{sat}$ is provided with a secondary winding $R_{sec}$ which, in series with a diode Dd, is connected across the DC input terminals. The diode Dd is arranged to block current flow from the positive DC input terminal to the negative one. When voltage across the primary of the saturable reactor reverses, the diode Dd permits the current induced in the secondary $R_{sec}$ to flow to the DC input, and excess energy is thus returned to the input circuit rather than being allowed to overcharge the capacitor. The amount of energy thus recovered is dependent upon the turns ratio of the windings of the saturable reactor, which should be selected with reference to the turns ratios of the energy-recovery transformers $Tr_U$ and $Tr_L$ inasmuch as both secondaries influence the amount of energy that will be returned to the input instead of being permitted to overcharge the capacitor. It will be understood that the secondary of the saturable reactor should in any case have a substantially larger number of winding turns than its primary.

Obviously the expedients just described with reference to FIGS. 3 and 4 are applicable to a chopper as well as to an inverter.

With either the chopper of FIG. 1 or the inverter of FIG. 2, the coupling between the primary and secondary windings of the energy-recovery transformers should be as close as possible. With ideal coupling, the voltage across the commutating capacitor would never exceed $E+E/n$, where $n$ is the turns ratio of the energy-recovery transformer and $E$ is the voltage across the DC input terminals.

Thus overshooting of the commutating capacitor can be minimized by reducing as much as possible the leakage inductance between the primary and secondary windings of the energy-recovery transformers, as by the employment of interleaved windings and powdered cores.

However, in many cases it is not economically feasible to achieve the optimum coupling between energy-recovery-transformer windings, and in any case the energy-transformer would have to have an extremely high turns-ratio (large number of secondary turns) to prevent overshooting to the point where voltage across the capacitor was substantially equal to $E$. With this in mind, the supplemental energy recovery means illustrated in FIGS. 5 and 6 are useful in many situations.

Figure 5:
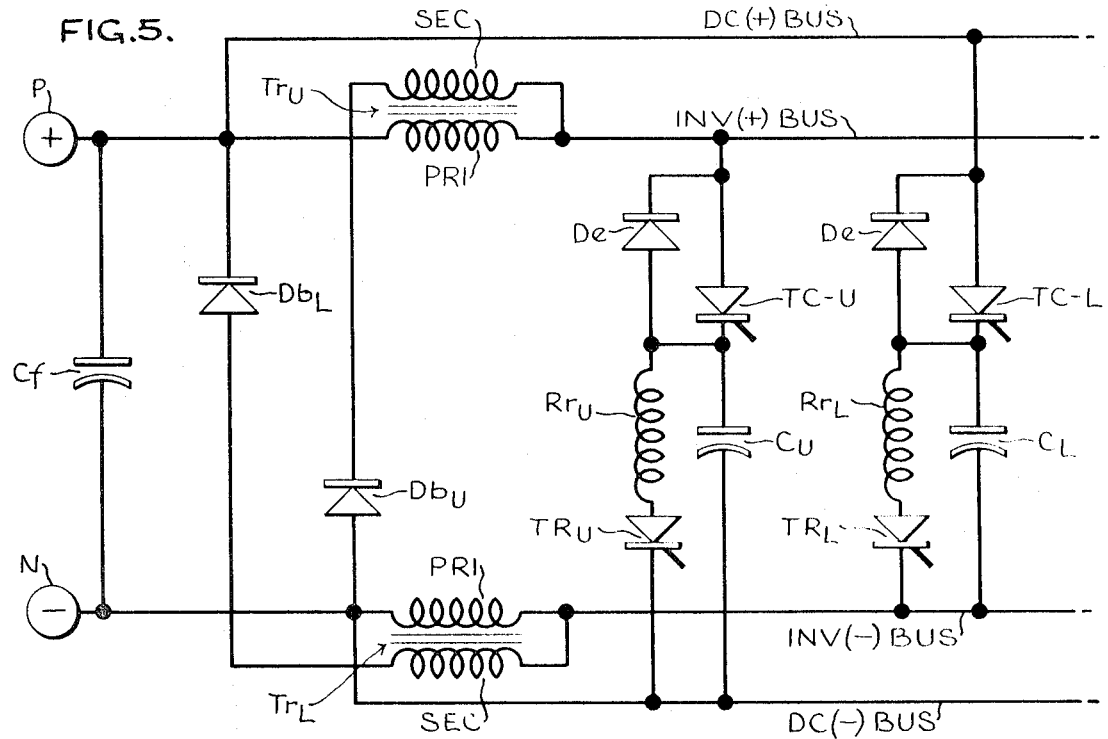
Figure 6:
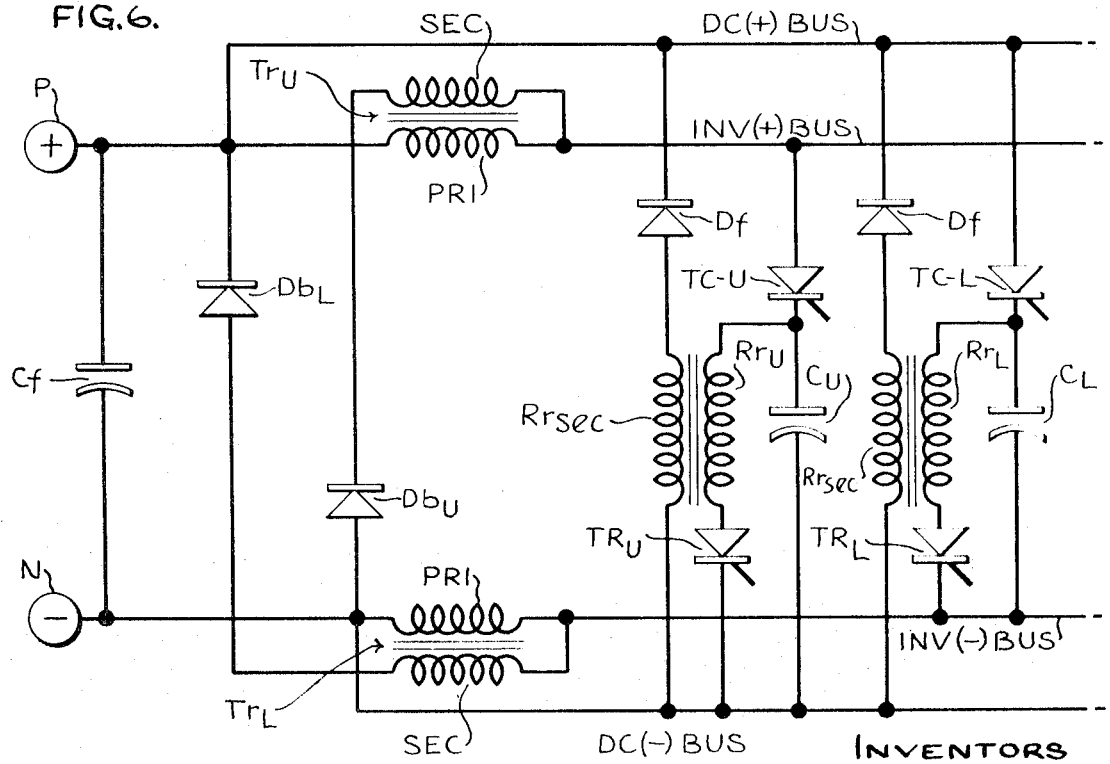

As illustrated in FIG. 5, a diode De can be connected across each commutating thyristor $TC_U$ and $TC_L$ arranged to conduct in the direction opposite to forward current flow through the commutating thyristor. The diode De is normally nonconducting, but it starts to conduct when potential across the capacitor is higher than the voltage across the DC input terminals, feeding energy back to the input and draining off the overcharge on the capacitor. It thus serves both for a sort of clamping and for energy recovery, and it is to be noted that it supplements the action of the secondary of its associated energy-recovery transformer.

Alternatively, the excess energy stored in the commutating capacitor by its overcharge during commutation can be returned to the input during recycling. The means for accomplishing this, which is illustrated in FIG. 6, comprises a secondary winding $Rr_{sec}$ coupled with each recycling reactor $Rr_U$ and $Rr_L$. A diode Df is connected in series with each secondary $Rr_{sec}$, and the series-connected secondary and diode are connected across the DC buses, and thus with the DC terminals. The diode Df is of course arranged to prevent current flow from the positive DC bus to the negative one. The amount of energy recovered will depend upon the turns ratio of the windings comprising the recycling reactor and its secondary. With a 1:1 ratio the voltage across the capacitor after recycling will have a value approximately equal to the voltage across the DC input terminals.

Figure 7:
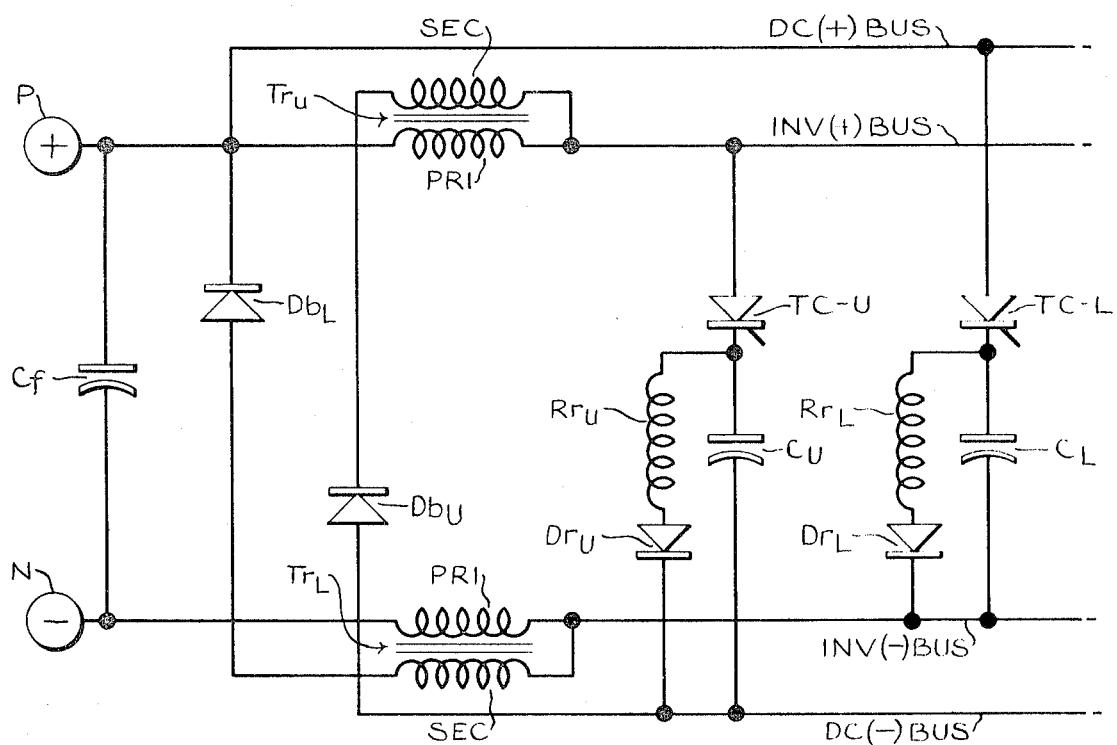

The circuit illustrated by FIG. 7 is similar to the basic inverter circuits of FIGS. 2 through 6, but it differs from them in that the unidirectionally conductive device of its recycling means comprises, in each instance, a diode $Dr_U$, $Dr_L$ instead of a thyristor. The FIG. 7 arrangement has the advantages of being less expensive in itself (a diode costs much less than a thyristor) and of simplifying the control apparatus associated with the chopper or inverter, inasmuch as no provision need be made for feeding gating signals to the unidirectionally conductive devices of the recycling means. However, the FIG. 7 arrangement requires substantially larger recycling reactors $Rr_U$ and $Rr_L$ than the other illustrated embodiments, and, specifically, each of the recycling reactors in the FIG. 7 version should be on the order of 8 to 10 times as large as the commutating reactors PRI.

The operation of the FIG. 7 circuit can be considered with reference to the commutation of the upper power thyristors. When the commutating thyristor TC-U is switched on, commutation proceeds in the usual manner, and until the voltage across the commutating capacitor $C_U$ has reached zero the diode $Dr_U$ remains rearwardly biased and no current flows through it or the commutating reactor $Rr_U$. However as the capacitor continues to be charged to its new polarity, the diode $Dr_U$ becomes forwardly biased and an increasing current flows through it and the recycling reactor, building a voltage across that reactor. After the capacitor reaches the peak of its charge of the new polarity, and the commutating thyristor TC-U is switched off, there is a tendency for current to continue to flow in the recycling reactor, in the direction forwardly with respect to the diode $Dr_U$, and since such current is flowing in an effectively closed and isolated circuit comprising the recycling reactor and the capacitor, it recharges the capacitor back to its original polarity. Thereafter, and until the commutating thyristor TC-U is again gated on, the diode $Dr_U$ and the commutating thyristor maintain this new charge of the original polarity upon the capacitor, the diode by reason of its being reverse biased by it and the thyristor by reason of its being switched off.

It will be apparent that during recycling the capacitor $C_U$ and the recycling reactor $Rr_U$ comprise a resonant circuit, and that the unidirectional current flow which takes place during recycling corresponds to one-half of an oscillatory cycle for this circuit. Since each of the recycling reactors $Rr_U$ and $Rr_L$ in the FIG. 7 embodiment is much larger than its associated commutating reactor PRI, the buildup of current in it is much slower than that in the commutating branch of the circuit, and therefore the recycling reactor, even though effectively in the circuit during commutation, does not adversely affect the commutating cycle.

Owing to the larger recycling reactors, the recycling time is longer in the FIG. 7 embodiment of the invention than in the other illustrated embodiments thereof, so that the commutating means is not available to be used again as soon after each commutation as when a thyristor is used in the recycling means. This disadvantage is more theoretical than real, however, since recycling is completed at about the same time as the completion of flow of current in the associated energy-recovery circuit comprising the secondary winding SEC, and commutation could not take place, anyway, as long as energy recovery is proceeding. Thus the use of a recycling diode instead of a recycling thyristor would be disadvantageous only where very fast commutation cycles were required, such that energy recovery was not feasible. For other applications the recycling diode will usually be preferred, since its operation is automatic, requiring no gating signal from the control device associated with the inverter or chopper.

From the foregoing description taken with the accompanying drawings it will be apparent that this invention provides a solid state chopper or inverter having power thyristors and having very efficient means for reversing the polarity of the commutating capacitors which are used for switching off the power thyristors.

What is claimed as our invention is:

1. Commutating apparatus for a switching device having anode and cathode terminals that are connected with a DC source in a series circuit with a load, and a gate to which a signal can be applied to render the switching device conductive, conductivity being terminable only by terminating forward current flow through the switching device, said commutating apparatus being of the type comprising a capacitor and a second gated switching device connected with one another in a second series circuit that is shunted across the first-mentioned series circuit, and reactance means connected with the DC source in a circuit common to both of said series circuits, the capacitor being normally charged to one polarity and conduction of the second switching device, when conducting, providing for diversion of current from the first-mentioned switching device to the capacitor to charge the same to opposite polarity, said commutating apparatus being characterized by:
  A. a saturable reactor having a primary winding connected in said second series circuit to limit the rate of rise of current through the second switching device upon its being rendered conductive;
  B. a secondary winding on the saturable reactor having a larger number of turns than the primary winding and inductively coupled therewith;
  C. a diode; and
  D. means connecting the diode in series with the secondary winding and the DC source in an energy-recovery circuit across the first-mentioned series circuit, with the diode arranged to conduct in the direction to feed energy back to the DC source when the current through the saturable reactor is decreasing.

2. Commutating apparatus for a switching device having anode and cathode terminals that are connected with a DC source in a series circuit with a load, and a gate to which a signal can be applied to render the switching device conductive, conductivity being terminable only by terminating forward current flow through the switching device, said commutating apparatus being of the type comprising a capacitor and a second gated switching device connected with one another in a second series circuit that is shunted across the first-mentioned series circuit, and reactance means connected with the DC source in a circuit common to both of said series circuits, the capacitor being normally charged to one polarity and conduction of the second switching device, when conducting, providing for diversion of current from the first-mentioned switching device to the capacitor to charge the same to opposite polarity, said commutating apparatus being characterized by:
  a diode connected across the second gated switching device and arranged to conduct in the direction opposite to conduction through the second gated switching device, to discharge from the capacitor so much of the charge of said opposite polarity as is substantially in excess of the DC source potential.

* * * * *